United States Patent Office 3,362,629
Patented Jan. 9, 1968

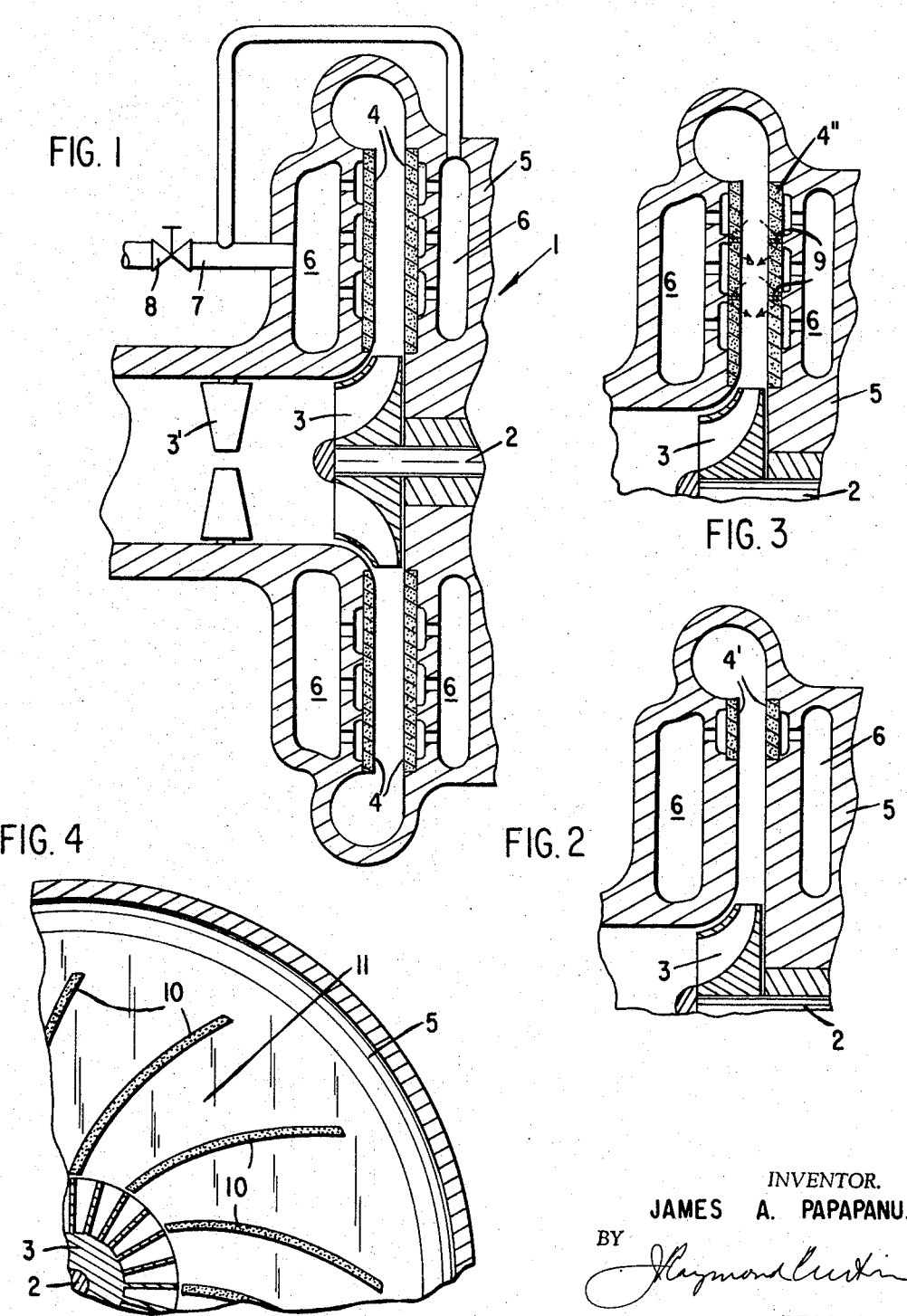

3,362,629
CENTRIFUGAL COMPRESSOR
James A. Papapanu, Syracuse, N.Y., assignor to Carrier Corporation, Syracuse, N.Y., a corporation of Delaware
Filed Dec. 21, 1965, Ser. No. 515,316
3 Claims. (Cl. 230—127)

ABSTRACT OF THE DISCLOSURE

A centrifugal compressor provided with porous diffuser walls for bleeding boundary layer gas from the diffuser to increase efficiency thereof. Solid annular rings in the porous wall are provided at varying radii to prevent recirculation of bleed air in a radial direction through the porous walls.

This invention relates to centrifugal gas compressor diffusers. More particularly, this invention relates to a means for limiting boundary layer growth on centrifugal gas compressor diffuser walls. Still more particularly, this invention relates to means for bleeding boundary layer gas from diffuser walls.

It is well known that in the aerodynamic flow of fluids, the progressive growth of a boundary layer of slow-moving fluid between a surface, such as the wall or blades of turbomachinery or wings and surfaces of aircraft, and the main gas stream produces undesirable effects such as increased flow resistance and flow separation. This is particularly true in flow situations where a rising pressure gradient in the direction of flow exists, such as in a diffuser or any device with a region of deceleration for velocity. In the case of a centrifugal compressor diffuser, this may lead to a condition known as surge at a flow rate lower than design flow.

It is also well known in the aerodynamic art that if this boundary layer can be reduced by its removal from the flow stream, more desirable flow conditions can be restored with lower associated losses. The means to accomplish this in centrifugal compressors has not been practical heretofore due to excessive cost and sophistry of equipment to do so. However, recent advances in technology of sintered metals and other porous media to provide strong, porous materials opens up new approaches.

It is, therefore, a chief object of this invention to provide a novel centrifugal compressor diffuser wall which will reduce boundary layer growth. It is a further object of this invention to provide porous centrifugal compressor diffuser walls to enable the boundary layer to be bled therefrom. It is a still further object of this invention to provide a centrifugal compressor having porous diffuser walls wherein the rate of boundary layer bleed off can be easily controlled.

The objects of this invention are attained by providing a centrifugal compressor with porous diffuser walls constructed of a material such as sintered metal. The back of the diffuser walls communicate with cavities formed in the compressor housing. These cavities communicate through bleed lines to the compressor inlet or other convenient location to create a low-pressure area behind the diffuser walls to cause sufficient gas to be withdrawn from the diffuser to eliminate boundary growth. A valve may be inserted in the bleed gas line to control the amount of gas bled through the diffuser walls.

Other objects and features of this invention will be apparent upon consideration of the ensuing specification and drawing in which:

FIGURE 1 is a partial elevational view in section of the diffuser area of a centrifugal compressor employing a vaneless diffuser.

FIGURE 2 is a partial elevational view in section of the diffuser area of a vaneless diffuser centrifugal compressor illustrating a second embodiment of my invention.

FIGURE 3 is a partial elevational view in section of the diffuser area of a vaneless diffuser centrifugal compressor illustrating a third embodiment of my invention.

FIGURE 4 is a sectional view of a compressor illustrating a porous vaned diffuser wall.

Referring more particularly to the drawing, there is shown a portion of a centrifugal compressor 1 of the kind employed to compress gaseous material having therein a shaft 2 with an impeller 3 mounted thereon. Movable guide vanes 3' common in many centrifugal compressors are mounted in the compressor inlet to vary the compressor capacity. Porous annular diffuser walls 4 of sintered metal or similar porous metal are affixed to the compressor housing 5. Cavities 6 in compressor housing 5 communicate with porous diffuser walls 4. Bleed gas return lines 7 provide a passage between cavities 6 and the compressor inlet to transmit gas withdrawn through diffuser walls 4 to the compressor inlet. Valve 8 in bleed gas return line 7 is provided to regulate the quantity of gas drawn through diffuser walls 4.

FIGURE 2 ilustrates an embodiment of my invention wherein a porous diffuser wall 4' is provided in the outer portion of the diffuser, if this is all that is required for a particular application.

FIGURE 3 illustrates a modified porous diffuser wall 4" having solid annular rings 9 formed therein to minimize possible recirculation of gas as indicated by the arrows. Since diffuser pressure is higher at greater radial distances from the impeller 3, there is a possibility that gas flowing through diffuser wall 4" would re-enter the diffuser at a lesser radial distance due to the lower pressure near the impeller 3. The solid annular ring would minimize this gas recirculation.

FIGURE 4 illustrates my invention as applied to a vaned diffuser having porous vanes 10 on the diffuser walls 11.

While it is true that the recirculating gas bled from the walls through a compressor increases compressor load, the improvement in compressor performance more than compensates for this. In addition, in centrifugal refrigerating systems, wherein refrigerant gas is pumped by a centrifugal compressor, this bleed gas could be used to advantage by introducing it into the liquid refrigerant collected in the evaporator of the refrigeration machine so as to cause increased refrigerant agitation. The increased evaporator performance thus obtained would have a pronounced effect on over-all refrigeration cycle performance which would compensate for the increased gas volume imposed upon the compressor.

Since compressor performance is usually quite adequate at or near design flow rates, it is not usually necessary to utilize a boundary layer return system at these conditions. The valve 8 in the bleed gas return line 7 can be operated by suitable control means responsive to compressor operating characteristics such as inlet guide vane position or pressure differential across the compressor to open the bleed line and place the boundary layer bleed system in operation only at reduced machine loads where it is of greater benefit.

While I have described a preferred embodiment of my invention, it is to be understood that the invention is not limited thereto, but may be otherwise embodied within the scope of the following claims.

I claim:
1. In a centrifugal compressor having a housing with an impeller rotatably mounted therein for inducing flow of gas axially therethrough and discharging the gas radially therefrom,
   gas diffuser means including a pair of spaced walls defining a vaneless diffuser path therebetween for the flow of gas discharged radially from said impeller, each wall being formed of closely compacted particles rendering the wall porous to the flow of gas adjacent the wall to inhibit the formation of boundary layer gas flow,
   radially spaced impervious sections disposed in said wall, arranged through the height of the wall to resist recirculation of the gas passing through the wall in the section immediately adjacent the section through which it passed, and
   means to provide a pressure differential across the diffuser wall in the areas defined by the impervious sections to cause a portion of the gas flowing over said diffuser wall to flow therethrough.

2. A centrifugal compressor according to claim 1 wherein said means for providing a pressure differential across said diffuser walls comprises a bleed gas line in communication with the back of said diffuser walls and the inlet of said compressor.

3. A centrifugal compressor according to claim 2 further including a bleed gas control valve in said bleed gas return line to regulate the flow of bleed gas through said line.

References Cited

UNITED STATES PATENTS 2,720,356  10/1955  Erwin _____ 230—122

FOREIGN PATENTS 490,265  1/1930  Germany.
504,214  4/1939  Great Britain.
619,722  3/1949  Great Britain.

DONLEY J. STOCKING, *Primary Examiner.*

HENRY F. RADUAZO, *Examiner.*